United States Patent
Doi

(10) Patent No.: US 10,978,909 B2
(45) Date of Patent: Apr. 13, 2021

(54) COIL MODULE AND COIL UNIT

(71) Applicant: TOYOTA JIDOSHA KABUSHIKI KAISHA, Toyota (JP)

(72) Inventor: Taiga Doi, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/402,420

(22) Filed: May 3, 2019

(65) Prior Publication Data

US 2019/0372392 A1 Dec. 5, 2019

(30) Foreign Application Priority Data

May 29, 2018 (JP) .............................. JP2018-102280

(51) Int. Cl.
*H02J 50/10* (2016.01)
*H01F 27/28* (2006.01)

(52) U.S. Cl.
CPC .......... *H02J 50/10* (2016.02); *H01F 27/2823* (2013.01)

(58) Field of Classification Search
None
See application file for complete search history.

(56) References Cited

U.S. PATENT DOCUMENTS

| | | | | |
|---|---|---|---|---|
| 2004/0188420 A1* | 9/2004 | Nishida | .................. | H05B 6/145 219/619 |
| 2013/0127409 A1 | 5/2013 | Ichikawa | | |
| 2013/0193749 A1 | 8/2013 | Nakamura et al. | | |
| 2014/0015338 A1* | 1/2014 | Yoshino | .................. | H02J 7/025 307/104 |
| 2015/0008877 A1 | 1/2015 | Ichikawa et al. | | |
| 2015/0054351 A1* | 2/2015 | Deguchi | ................. | H01F 38/14 307/104 |
| 2015/0145630 A1* | 5/2015 | Suzuki | .................... | H02J 50/10 336/200 |
| 2015/0332841 A1 | 11/2015 | Hasegawa et al. | | |

FOREIGN PATENT DOCUMENTS

| | | |
|---|---|---|
| JP | 2013-110822 A | 6/2013 |
| JP | 2013-126327 A | 6/2013 |
| JP | 2013-146148 A | 7/2013 |
| JP | 2013-146154 A | 7/2013 |
| JP | 2013-154815 A | 8/2013 |
| JP | 2014-120325 A | 6/2014 |
| JP | 2017-004790 A | 1/2017 |
| JP | 2018-006174 A | 1/2018 |

* cited by examiner

*Primary Examiner* — Cassandra F Cox
(74) *Attorney, Agent, or Firm* — Sughrue Mion, PLLC

(57) ABSTRACT

A coil module includes: a coil formed by winding a coil wire; and an insulating member. The coil includes a first wound portion and a second wound portion, the first wound portion being formed to surround the winding axis, the second wound portion being formed at a position adjacent to the first wound portion on an outer perimeter side of the coil. The insulating member includes a first insulating portion configured to cover a perimeter surface of the first wound portion, and a second insulating portion configured to cover a perimeter surface of the second wound portion. A portion of a surface of the first insulating portion located on the outer perimeter side of the coil is in contact with a portion of a surface of the second insulating portion located on the winding axis side.

6 Claims, 9 Drawing Sheets

COIL MODULE AND COIL UNIT

This nonprovisional application is based on Japanese Patent Application No. 2018-102280 filed on May 29, 2018 with the Japan Patent Office, the entire contents of which are hereby incorporated by reference.

BACKGROUND

Field

The present disclosure relates to a coil module and a coil unit.

Description of the Background Art

Various types of coil modules provided in a wireless charging system have been conventionally proposed (Japanese Patent Laying-Open No. 2013-154815, Japanese Patent Laying-Open No. 2013-146154, Japanese Patent Laying-Open No. 2013-146148, Japanese Patent Laying-Open No. 2013-110822, and Japanese Patent Laying-Open No. 2013-126327). For example, a coil module described in Japanese Patent Laying-Open No. 2017-4790 includes a coil and a spacer. The coil is formed by winding a litz wire in a spiral manner with a predetermined pitch, and the spacer is inserted in the pitch of the coil.

The spacer is not bonded to the coil, and thus, the spacer and the coil are formed to be movable relative to each other.

When the coil module is manufactured, a reel is first prepared. The reel includes an annular planar portion, and a cylindrical portion disposed at the center of the planar portion.

Then, the reel is rotated with the litz wire and an end of the spacer being fixed to the planar portion, to thereby wind the litz wire and the spacer. At this time, the litz wire and the spacer are fed in synchronization with the rotation of the reel. Thus, the litz wire and the spacer are wound, while suppressing application of the tensile force to the litz wire and the spacer. As a result, the litz wire is disposed in the pitch of the coil in a state where the spacer is not under load from the coil (in a no-load state).

The litz wire and the spacer are wound as described above. Therefore, the litz wire is wound to form the coil, and the spacer is disposed in the pitch of the coil. The above-described coil module is thus molded.

SUMMARY

In the coil module configured as described above, the spacer is not under load from the coil and the spacer is provided to be movable relative to the coil. Therefore, when the external force is applied to the coil module, at least a part of the spacer may fall from the pitch of the coil.

When the spacer falls from the pitch and a part of the spacer projects from the pitch of the coil, an inductance of the coil varies because a dielectric constant of the air and a dielectric constant of the spacer are different from each other.

Furthermore, unless the feeding speed and the winding speed are accurately controlled when the litz wire and the spacer are fed in the no-load state in the process of winding the litz wire and the spacer, deflection and the like may occur in the litz wire and the spacer, and the litz wire may deviate from a desired position. Therefore, it may become difficult to wind the litz wire with a predetermined pitch, and the coil may become less likely to have a desired shape. The inductance of the coil varies depending on the pitch of the coil, and the inductance of the coil is an important parameter that also affects the power transmission efficiency.

The present disclosure has been made in light of the above-described problem, and an object of the present disclosure is to provide a coil module and a coil unit with suppressed variation in inductance.

A coil module according to the present disclosure includes: a coil formed by winding a coil wire so as to surround a winding axis and get away from the winding axis as the coil wire extends from one end toward the other end; and an insulating member formed to cover a perimeter surface of the coil wire when the coil wire is cross-sectionally viewed along a cross section perpendicular to a direction of extension of the coil wire, and formed to extend from the one end to the other end of the coil wire. When the coil is cross-sectionally viewed along the cross section perpendicular to the direction of extension of the coil wire, the coil includes a first wound portion and a second wound portion, the first wound portion being formed to surround the winding axis, the second wound portion being formed to surround the winding axis and formed at a position adjacent to the first wound portion on an outer perimeter side of the coil. The insulating member includes a first insulating portion configured to cover a perimeter surface of the first wound portion, and a second insulating portion configured to cover a perimeter surface of the second wound portion. A portion of a surface of the first insulating portion located on the outer perimeter side of the coil is in contact with a portion of a surface of the second insulating portion located on the winding axis side, thereby spacing the first wound portion and the second wound portion apart from each other by a predetermined distance.

According to the above-described coil module, the insulating member is formed to cover the perimeter surface of the coil wire, and thus, even when the impact force and the like are applied from outside, detachment of the insulating member from the coil can be suppressed. If the insulating member is detached from the coil, an inductance tends to vary due to a difference in dielectric constant between the air and the insulating member. However, in the above-described coil module, detachment of the insulating member from the coil is suppressed, and thus, variation in inductance can be suppressed.

Furthermore, the outer perimeter surface of the first insulating portion is in contact with the inner perimeter surface of the second insulating portion, thereby setting a coil pitch. Therefore, by winding the coil wire such that the outer perimeter surface of the first insulating portion is in contact with the inner perimeter surface of the second insulating portion when the coil module is molded, the coil pitch can be easily set and occurrence of unevenness in coil pitch can be suppressed. When the coil pitch varies, the inductance tends to vary. However, according to the above-described coil module, occurrence of unevenness in coil pitch can be suppressed and variation in inductance can be suppressed.

In the above-described coil module, a recess is formed in one of the portion of the surface of the first insulating portion located on the outer perimeter side of the coil and the portion of the surface of the second insulating portion located on the winding axis side, and a protrusion inserted into the recess is formed on the other of the portion of the surface of the first insulating portion located on the outer perimeter side of the coil and the portion of the surface of the second insulating portion located on the winding axis side.

According to the above-described coil module, the protrusion formed on the other of the first insulating portion and the second insulating portion fits into the recess formed in one of the first insulating portion and the second insulating portion, which makes it possible to suppress displacement of the first insulating portion and the second insulating portion, for example, when the coil module is molded.

In the above-described coil module, in a direction of extension of the winding axis, a distance between an outer surface of the insulating member and the coil is longer than a distance between the first wound portion and the second wound portion.

In the direction of extension of the winding axis, an insulation distance between the coil and the devices and members adjacent to the coil module can be increased.

The above-described coil module further includes a mold resin configured to cover the coil and the insulating member.

In the above-described coil module, even when the impact force is applied from outside, deformation and the like of the coil module can be suppressed and variation in inductance can be suppressed.

A coil unit according to the present disclosure is a coil unit capable of one of power reception from an external coil unit provided outside and power transmission to the external coil unit, the coil unit including the above-described coil module.

According to the above-described coil unit, variation in inductance of the coil module can be suppressed.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
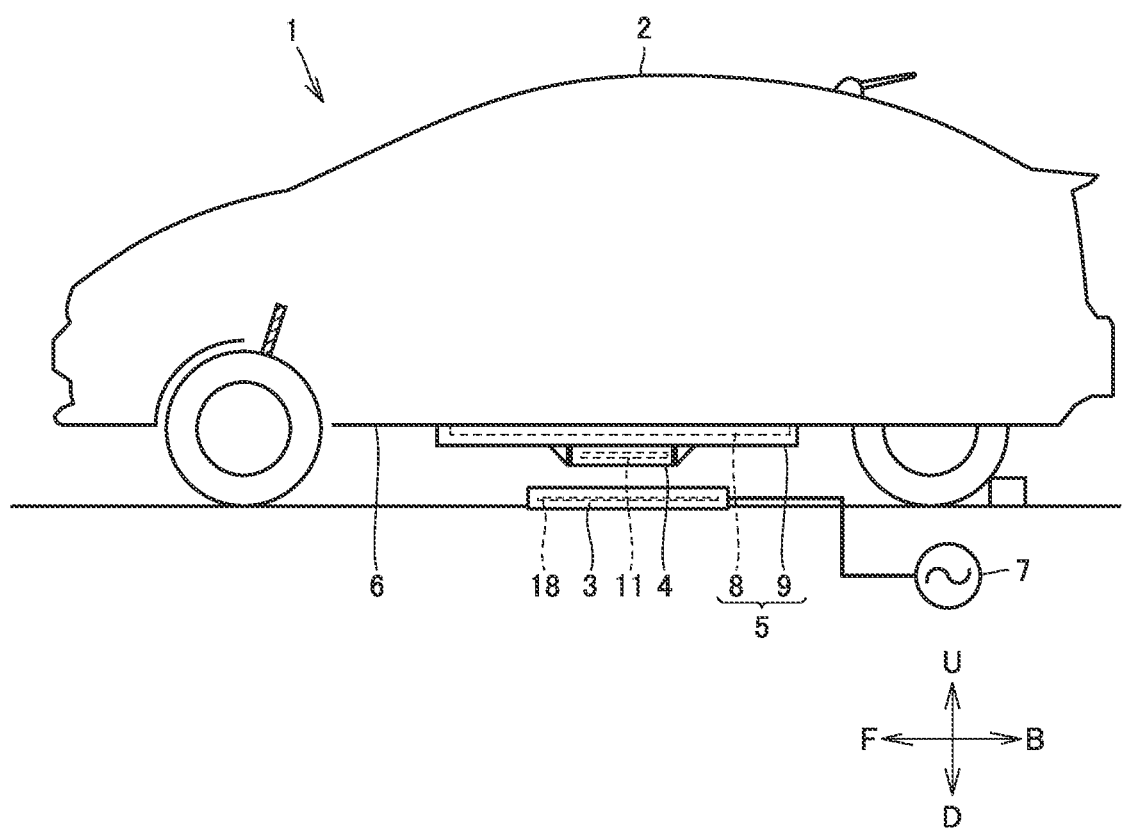
FIG. 1 is a schematic view showing a wireless charging system 1.

A coil module according to the present embodiment will be described with reference to FIGS. 1 to 17. The same or substantially the same components, of the components shown in FIGS. 1 to 17, are denoted by the same reference characters and redundant description will not be repeated. The components corresponding to the components claimed in the claims may be described in the embodiment along with the parenthesized components in the claims.

FIG. 1 is a schematic view showing a wireless charging system 1. Wireless charging system 1 includes a vehicle 2 provided with a coil unit (external coil unit) 4, and a coil unit 3 provided on the ground side. Coil unit 3 includes a coil module 18, and coil unit 3 is connected to an external power supply 7.

Vehicle 2 includes a floor panel 6, and a battery 5 provided on a lower surface of floor panel 6. Coil unit 4 is provided on a lower surface of battery 5, and coil unit 4 includes a coil module 11.

Battery 5 includes a battery module 8 and a battery case 9. Battery case 9 is made of aluminum or the like.

When electric power is wirelessly transmitted from coil unit 3 to coil unit 4, the electric power is supplied from external power supply 7 to coil module 18 of coil unit 3, and the electric power is transmitted to coil module 11 of coil unit 4 through an electromagnetic field formed around coil unit 3.

Figure 2:
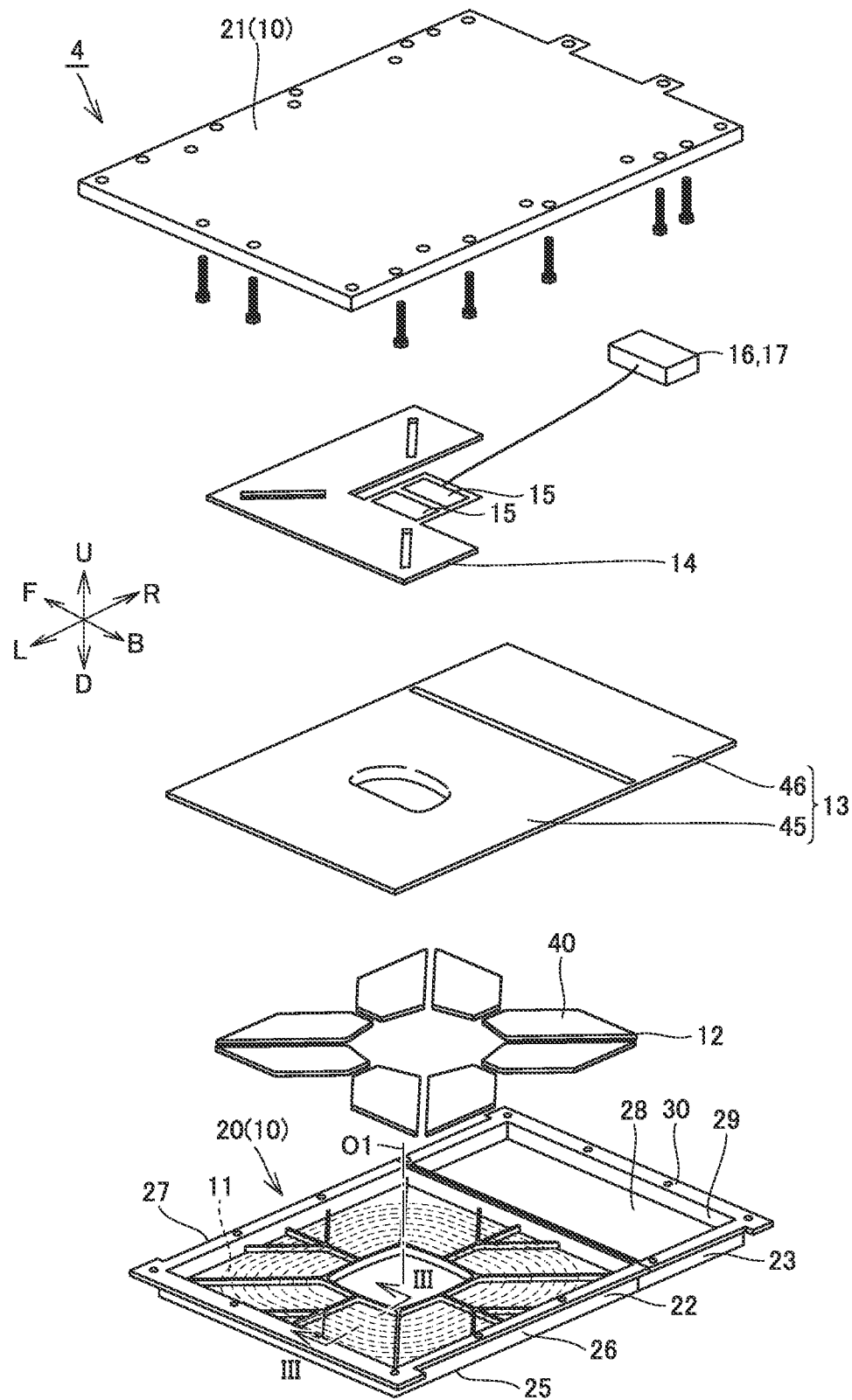
FIG. 2 is an exploded perspective view showing a coil unit 4.
Figure 3:
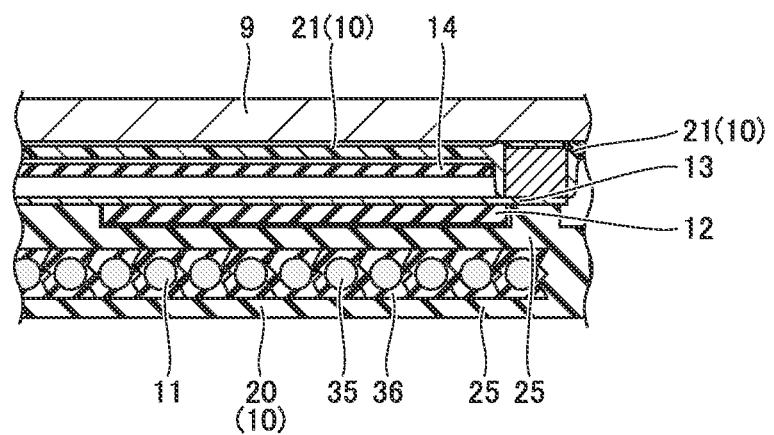
FIG. 3 is a cross-sectional view taken along line shown in FIG. 2.

FIG. 2 is an exploded perspective view showing coil unit 4. FIG. 3 is a cross-sectional view taken along line shown in FIG. 2.

Coil unit 4 includes a housing 10, coil module 11, a ferrite plate 12, an aluminum plate 13, a substrate 14, a capacitor 15, a filter 16, and a rectifier 17.

Housing 10 includes an under cover 20 and an upper cover 21. Upper cover 21 is made of resin. Upper cover 21 is fixed to a lower surface of battery case 9 shown in FIG. 1. Under cover 20 is disposed on the lower surface side of coil unit 4.

Under cover 20 includes a resin cover 22 and a metal cover 23. Resin cover 22 and metal cover 23 are arranged in the right/left direction of vehicle 2. Resin cover 22 includes a bottom plate 25, a perimeter wall portion 26 and a flange portion 27.

Bottom plate 25 is formed to have a plate shape. Perimeter wall portion 26 is formed to extend upwardly from an outer perimeter edge of bottom plate 25, and perimeter wall portion 26 is formed annularly along the outer perimeter edge of bottom plate 25. Flange portion 27 is formed to project horizontally from an upper end of perimeter wall portion 26.

Metal cover 23 includes a bottom plate 28, a perimeter wall 29 and a flange portion 30. Perimeter wall 29 is formed to extend upwardly from an outer perimeter edge of bottom plate 28. Flange portion 30 is formed to project horizontally from an upper side of perimeter wall 29.

Coil module 11 is provided within bottom plate 25 of resin cover 22. Coil module 11 is formed to surround a winding axis O1 extending in the upward/downward direction. As shown in FIG. 3, coil module 11 includes a coil 35 and an insulating member 36. Coil module 11 is embedded in bottom plate 25 of resin cover 22. That is, bottom plate 25 functions as a mold resin for coil module 11. The detailed configuration of coil module 11 will be described below.

Referring again to FIG. 2, ferrite plate 12 is disposed on an upper surface of bottom plate 25 of under cover 20.

Ferrite plate 12 is formed to have a plate shape, and ferrite plate 12 includes a plurality of divided ferrite plates 40. The plurality of divided ferrite plates 40 are formed annularly to surround winding axis O1.

Aluminum plate 13 is disposed on the upper surface side of ferrite plate 12. Aluminum plate 13 includes a plate portion 45 and a plate portion 46. Plate portion 45 is disposed within resin cover 22, and plate portion 46 is disposed within metal cover 23.

Substrate 14 is disposed on an upper surface of plate portion 45. Capacitor 15 is disposed in substrate 14. Capacitor 15 is formed of, for example, a plurality of ceramic capacitors. Opposing ends of coil module 11 are connected to capacitor 15. Filter 16 is provided on an upper surface of plate portion 46. Upper cover 21 is disposed on the upper surface side of substrate 14 and filter 16.

Figure 4:
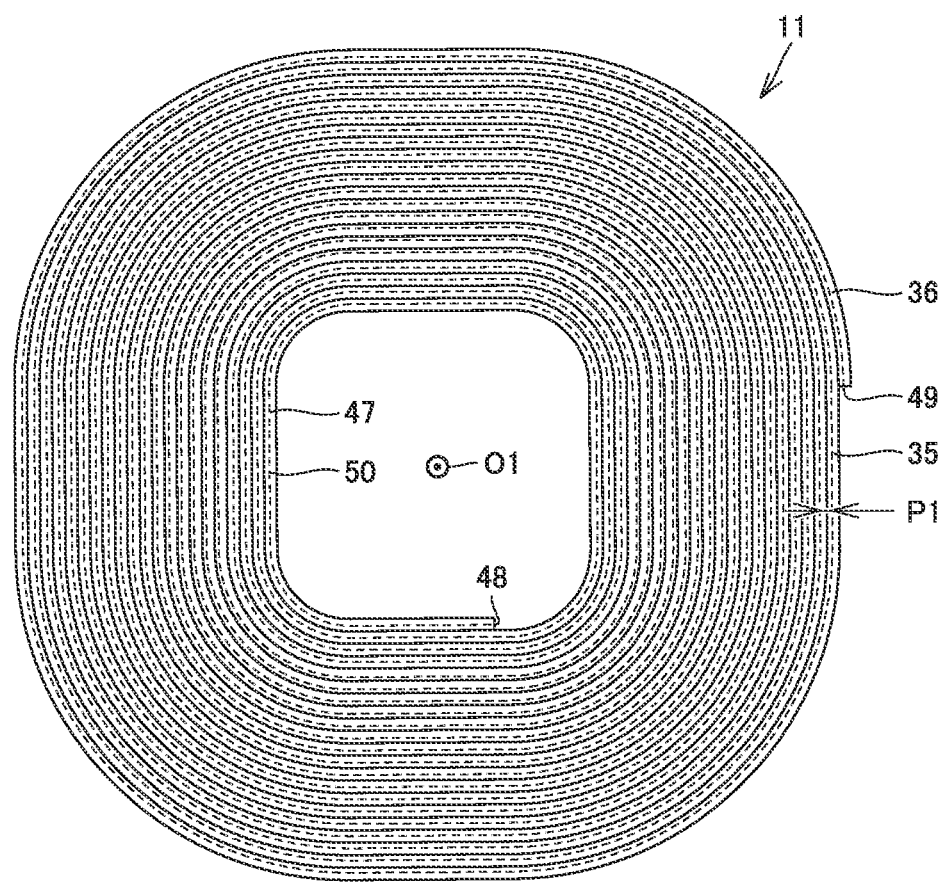
FIG. 4 is a plan view showing a coil module 11.

FIG. 4 is a plan view showing coil module 11. In FIG. 4, the broken line indicates coil 35. Coil 35 is provided with a hollow portion 47 through which winding axis O1 passes.

Coil 35 is formed by winding a coil wire 50 so as to surround winding axis O1, and coil wire 50 includes an inner perimeter end (one end) 48 and an outer perimeter end (the other end) 49.

Figure 5:
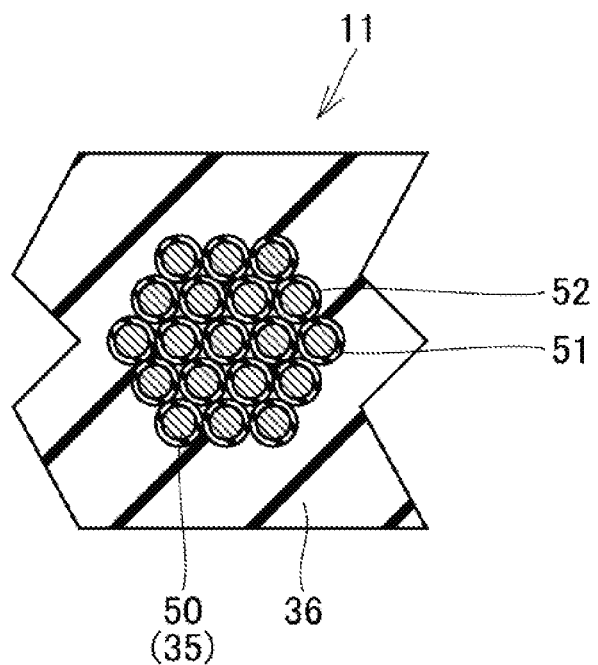
FIG. 5 is a cross-sectional view when a part of coil module 11 is cross-sectionally viewed in a direction of extension of a coil wire 50.

FIG. 5 is a cross-sectional view when a part of coil module 11 is cross-sectionally viewed in a direction of extension of coil wire 50. Coil wire 50 is a litz wire and includes a plurality of wires 51. An insulating coating 52 is formed on a surface of wire 51.

When coil 35 is cross-sectionally viewed in the direction of extension of coil wire 50, insulating member 36 is formed to cover a perimeter surface of coil wire 50. Insulating member 36 is formed from inner perimeter end 48 to outer perimeter end 49 of coil wire 50 shown in FIG. 4. Insulating member 36 is formed on the perimeter surface of coil wire 50 by injection molding, and insulating member 36 and coil wire 50 are bonded to each other.

Figure 6:
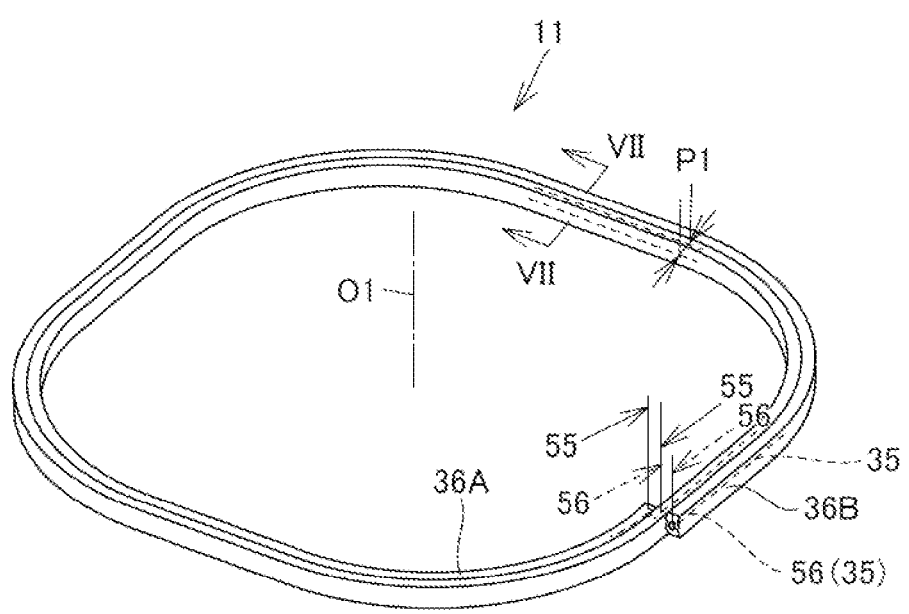
FIG. 6 is a perspective view when a part of coil module 11 is cross-sectionally viewed.

FIG. 6 is a perspective view when a part of coil module 11 is cross-sectionally viewed. Coil 35 includes a wound portion (first wound portion) 55 and a wound portion (second wound portion) 56. Wound portion 55 is formed to surround winding axis O1. In the example shown in FIG. 6, wound portion 55 goes around winding axis O1. An insulating portion (first insulating portion) 36A is formed on a perimeter surface of wound portion 55.

Wound portion 56 is formed at a position adjacent to wound portion 55 on the outer perimeter side of coil 35. In the example shown in FIG. 6, wound portion 56 goes around winding axis O1. An insulating portion (second insulating portion) 36B is formed on a perimeter surface of wound portion 56.

Figure 7:
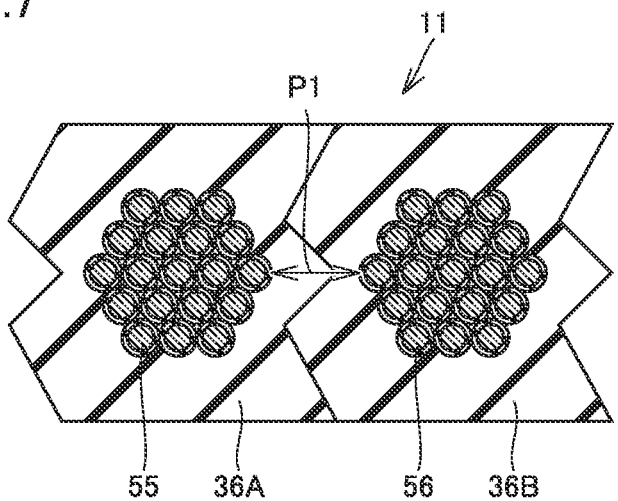
FIG. 7 is a cross-sectional view taken along line VII-VII shown in FIG. 6.

FIG. 7 is a cross-sectional view taken along line VII-VII shown in FIG. 6. A pitch between wound portion 55 and wound portion 56 is indicated with a pitch P1, and a pitch of coil 35 is pitch P1 from inner perimeter end 48 to outer perimeter end 49 shown in FIG. 4.

Figure 8:
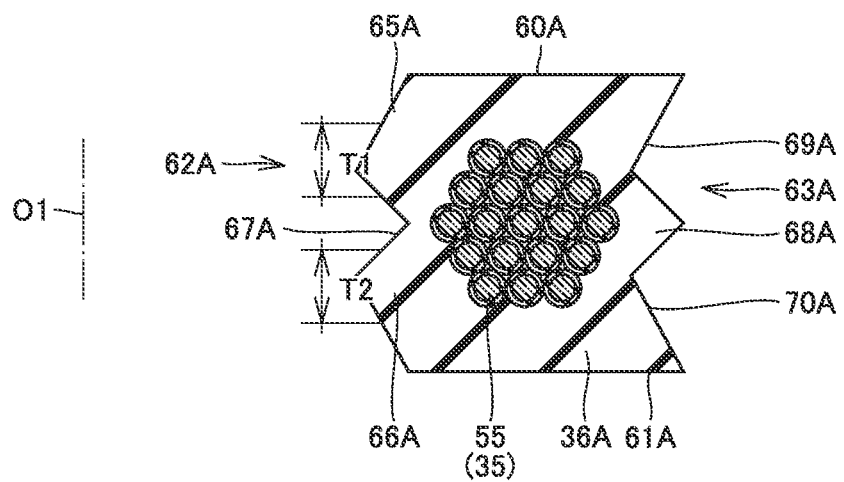
FIG. 8 is a cross-sectional view showing a wound portion 55 and an insulating portion 36A.

FIG. 8 is a cross-sectional view showing wound portion 55 and insulating portion 36A. Insulating portion 36A includes an upper surface 60A, a lower surface 61A, an inner perimeter surface 62A, and an outer perimeter surface 63A. Upper surface 60A and lower surface 61A are formed to have a flat surface shape.

A protruding portion 65A and a protruding portion 66A are formed on inner perimeter surface 62A so as to be spaced apart from each other in a direction of extension of winding axis O1. A recessed portion 67A is formed between protruding portion 65A and protruding portion 66A.

Protruding portion 65A and protruding portion 66A extend in a direction of extension of coil 35, and recessed portion 67A also extends in the direction of extension of coil 35. Thicknesses T1 and T2 of protruding portions 65 and 66 in the direction of extension of winding axis O1 decrease with decreasing distance from winding axis O1. A width of recessed portion 67A in the direction of extension of winding axis O1 increases with decreasing distance from winding axis O1.

A protruding portion (protrusion) 68A and recessed portions (recesses) 69A and 70A are formed on outer perimeter surface 63A. Protruding portion 68A is formed at the center of outer perimeter surface 63A in the direction of extension of winding axis O1. Recessed portion 69A is formed on the upper surface 60A side with respect to protruding portion 68A, and recessed portion 70A is formed on the lower surface 61A side with respect to protruding portion 68A.

In the direction of extension of winding axis O1, a thickness of protruding portion 68A decreases with increasing distance from winding axis O1. In the direction of extension of winding axis O1, opening widths of recessed portions 69A and 70A increase with increasing distance from winding axis O1.

Figure 9:
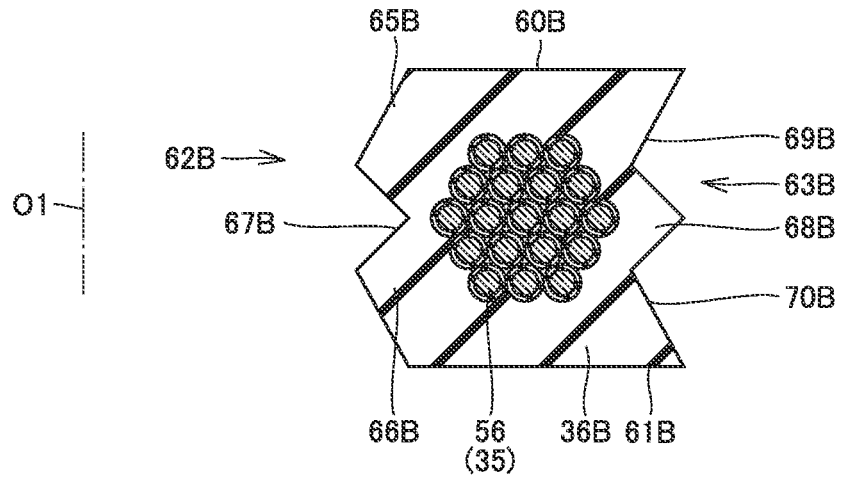
FIG. 9 is a cross-sectional view showing a wound portion 56 and an insulating portion 36B.

FIG. 9 is a cross-sectional view showing wound portion 56 and insulating portion 36B. Insulating portion 36B has the same shape as that of insulating portion 36A. Insulating portion 36B includes an upper surface 60B, a lower surface 61B, an inner perimeter surface 62B, and an outer perimeter surface 63B. A protruding portion 65B and a protruding portion 66B are formed on inner perimeter surface 62B so as to be spaced apart from each other in the direction of extension of winding axis O1. A recessed portion (recess) 67B is formed between protruding portion (protrusion) 65B and protruding portion 66B. A protruding portion 68B and recessed portions 69B and 70B are formed on outer perimeter surface 63B. Protruding portion 68B is formed at the center of outer perimeter surface 63B in the direction of extension of winding axis O1. Recessed portion 69B is formed on the upper surface 60B side with respect to protruding portion 68B, and recessed portion 70B is formed on the lower surface 61B side with respect to protruding portion 68B.

Protruding portions 65B, 66B and 68B have the same shape as that of protruding portions 65A, 66A and 68A. In FIGS. 8 and 9, protruding portion 68A of insulating portion 36A fits into recessed portion 67B of insulating portion 36B, and protruding portions 65B and 66B of insulating portion 36B fit into recessed portions 69A and 70A of insulating portion 36A.

Outer perimeter surface 63A of insulating portion 36A is in contact with inner perimeter surface 62B of insulating portion 36B in this manner, and as shown in FIG. 7, a pitch between wound portion 55 in insulating portion 36A and wound portion 56 in insulating portion 36B is set at pitch (predetermined distance) P1. Pitch P1 is, for example, approximately several millimeters to one centimeter. Pitch P1 is determined by a preset inductance of coil module 11.

In FIGS. 8 and 9, protruding portion 68A of insulating portion 36A fits into recessed portion 67B of insulating portion 36B, and protruding portions 65B and 66B of insulating portion 36B fit into recessed portions 69A and 70A of insulating portion 36A. Thus, even when the external force is applied to coil module 11, displacement of insulating portion 36A and insulating portion 36B in the upward/downward direction can be suppressed. As a result, displacement of wound portion 55 and wound portion 56 in the upward/downward direction can be suppressed.

As described above, displacement of wound portion 55 and wound portion 56 is suppressed, and thus, variation in inductance of coil module 11 can be suppressed.

In addition, insulating member 36 of coil module 11 is bonded to the perimeter surface of coil 35. Therefore, displacement of insulating member 36 from coil 35 or detachment of insulating member 36 from coil 35 caused by the external force applied to coil module 11 are suppressed. As a result, it is possible to suppress variation in dielectric constant of coil module 11 and variation in inductance of coil module 11 caused by displacement of insulating member 36 from coil 35 or detachment of insulating member 36 from coil 35.

Figure 10:
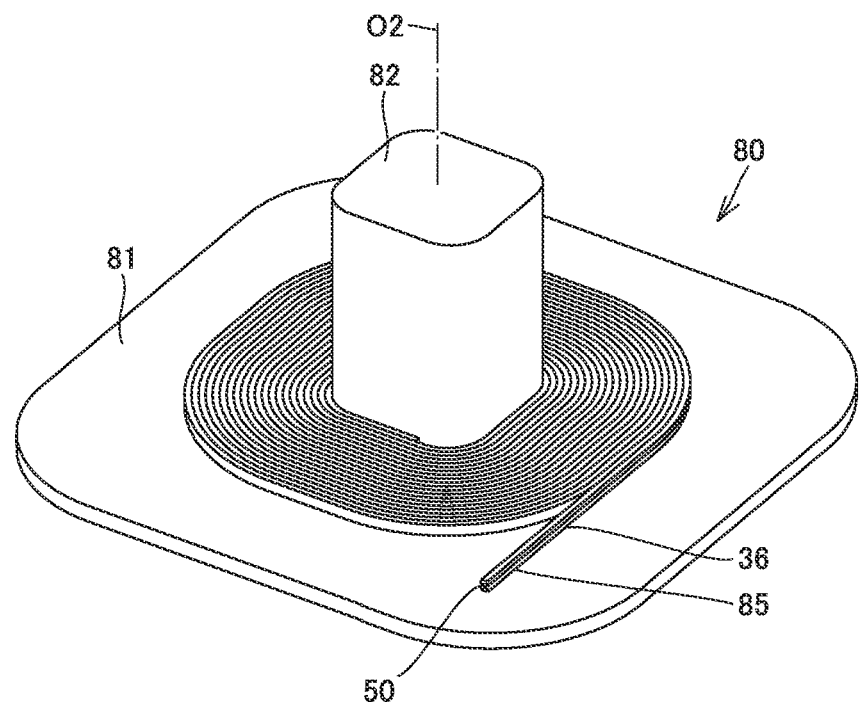
FIG. 10 is a perspective view schematically showing a winding apparatus 80.

Next, a method for manufacturing coil module 11 will be described with reference to FIG. 10 and the like. FIG. 10 is a perspective view schematically showing a winding apparatus 80.

Winding apparatus 80 includes a placement plate 81 and a pillar portion 82. Placement plate 81 is formed to have a plate shape. Placement plate 81 and pillar portion 82 rotate integrally about a rotation center line O2. Pillar portion 82 is formed at a position on an upper surface of placement plate 81, through which rotation center line O2 passes.

A coil wire module 85 is prepared. Coil wire module 85 includes linearly formed coil wire 50 and insulating member 36 configured to cover a surface of coil wire 50.

Then, a tip of coil wire module 85 is fixed to a perimeter surface of pillar portion 82. In this state, placement plate 81 and pillar portion 82 are rotated integrally about rotation center line O2, and at the same time, coil wire module 85 is sequentially fed.

As a result, coil wire module 85 is wound around the perimeter surface of pillar portion 82 and coil wire module 85 is further wound around the outer perimeter surface of already-wound coil wire module 85.

Coil wire module 85 fed in this manner is under tensile force. Therefore, the rotation of placement plate 81 and pillar portion 82 allows the predetermined tensile force to be applied to coil wire module 85 when coil wire module 85 is fed.

Figure 11:
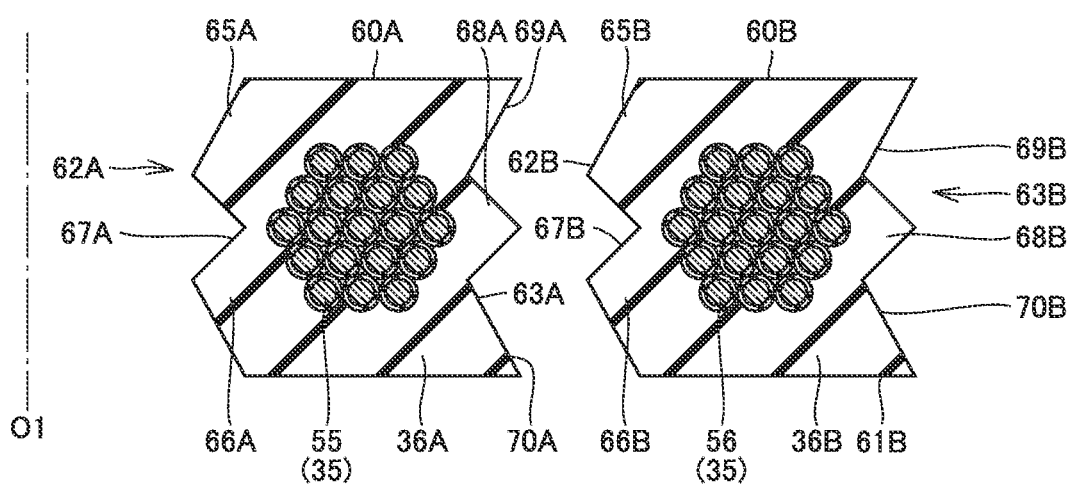
FIG. 11 is a cross-sectional view showing a state in which wound portion 56 is wound around an outer perimeter of wound portion 55 in a process of winding a coil wire module 85.

Therefore, the rotation of placement plate 81 and pillar portion 82 allows the adhesion force equal to or stronger than the predetermined adhesion force to be applied between coil wire modules 85 when new coil wire module 85 is wound on the outer perimeter side of already-wound coil wire module 85. FIG. 11 is a cross-sectional view showing a state in which wound portion 56 is wound around an outer perimeter of wound portion 55 in a process of winding coil wire module 85.

When wound portion 56 is wound on the outer perimeter side of wound portion 55, protruding portions 65B and 66B of insulating portion 36B formed on the perimeter surface of wound portion 56 fit into recessed portions 69A and 70A of insulating portion 36A formed in the perimeter surface of wound portion 55. In addition, protruding portion 68A formed on outer perimeter surface 63A of insulating portion 36A fits into recessed portion 67B formed in inner perimeter surface 62B of insulating portion 36B.

Therefore, it is possible to suppress displacement of wound portion 56 and insulating portion 36B from wound portion 55 and insulating portion 36A when wound portion 56 and insulating portion 36B are wound on the outer perimeter side of wound portion 55 and insulating portion 36A.

Furthermore, coil wire module 85 is wound, with coil wire module 85 being under tensile force. Therefore, it is possible to suppress occurrence of gaps between the respective recessed and protruding portions when protruding portions 65B and 66B fit into recessed portions 69A and 70A and protruding portion 68A fits into recessed portion 67B. As a result, as shown in FIG. 7, the pitch between wound portion 55 and wound portion 56 can be set at pitch P1.

Recessed portions 69A and 70A are formed such that the widths thereof increase with increasing distance from winding axis O1, and protruding portions 65B and 66B are formed such that the thicknesses thereof increase with increasing distance from winding axis O1. Therefore, protruding portions 65B and 66B easily fit into recessed portions 69A and 70A.

Protruding portion 68A is formed such that the thickness thereof decreases with increasing distance from winding axis O1, and recessed portion 67B is formed such that the width thereof decreases with increasing distance from winding axis O1. Therefore, protruding portion 68A easily fits into recessed portion 67B.

As described above, protruding portions 65B, 66B and 68A easily fit into recessed portions 69A, 70A and 67B when wound portion 56 and insulating portion 36B are wound on the outer perimeter side of wound portion 55 and insulating portion 36A. Therefore, wound portion 56 and insulating portion 36B can be excellently wound on the outer perimeter side of wound portion 55 and insulating portion 36A.

As shown in FIG. 3, coil module 11 is embedded in bottom plate 25 of under cover 20. Bottom plate 25 is made of resin and coil module 11 is molded by bottom plate 25.

One possible method for fixing coil module 11 to bottom plate 25 is to fix coil module 11 to the upper surface of bottom plate 25 by providing a claw portion engaging coil module 11 on the upper surface of bottom plate 25.

For example, when the impact force is applied from the lower surface of coil unit 4 in the case of fixing coil module 11 by the claw portion, a part of coil module 11 is detached from the claw portion, which tends to bring about a state in which the part of coil module 11 is floating from the upper surface of bottom plate 25. When the state in which the part of coil module 11 is floating from bottom plate 25 is brought about, the coil pitch tends to vary and the inductance tends to vary in the floating portion.

On the other hand, coil module 11 according to the present embodiment is embedded in the resin (mold resin) of bottom plate 25. Therefore, even when the impact force is applied from the lower surface of coil unit 4, such deformation that a part of coil module 11 or the like is detached from bottom plate 25 is suppressed. Therefore, even when the impact force is applied from outside, variation in inductance of coil module 11 can be suppressed.

Furthermore, when coil module 11 receives electric power, a large electric current of receiving power flows through coil module 11. When the electric current of receiving power flows through coil module 11, coil module 11 generates heat. However, since coil module 11 is molded by the resin of bottom plate 25, a contact area of coil module 11 and bottom plate 25 is large, and thus, the heat of coil module 11 is excellently released to bottom plate 25. The lower surface of bottom plate 25 is exposed to the outside air, and thus, the heat of coil module 11 is released to the outside through bottom plate 25. In this manner, an increase in temperature of coil module 11 is suppressed, and thus, it is possible to suppress deformation of coil module 11 by heat or occurrence of a crack in insulating member 36 due to a difference in thermal expansion coefficient between insulating member 36 and coil 35.

Next, various modifications of coil module 11 according to the present embodiment will be described with reference to FIG. 12 and the like.

Figure 12:
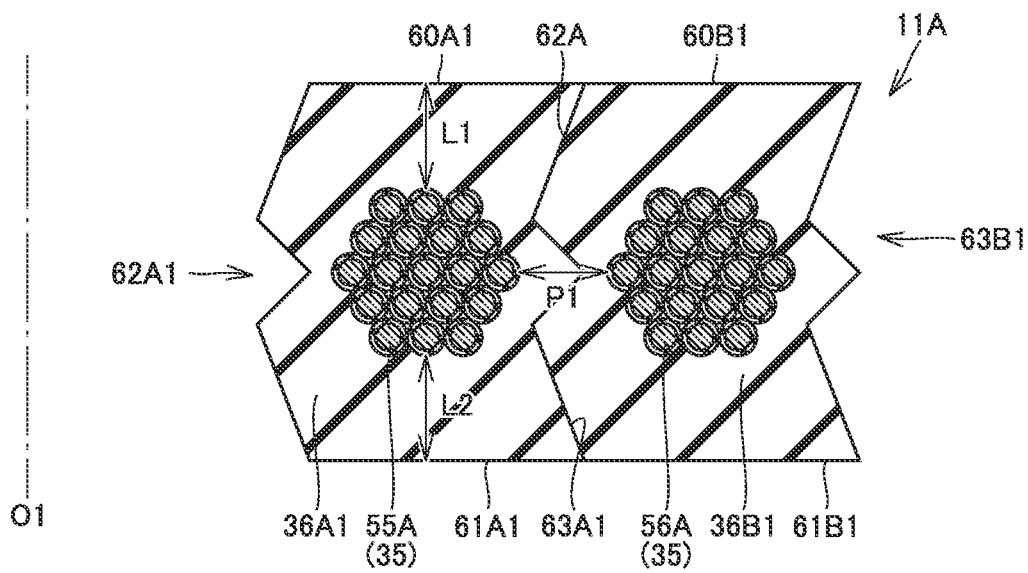
FIG. 12 is a cross-sectional view showing a part of a coil module 11A which is a first modification of coil module 11.

FIG. 12 is a cross-sectional view showing a part of a coil module 11A which is a first modification of coil module 11.

Coil module 11A includes a wound portion 55A and an insulating portion 36A1 as well as a wound portion 56A and an insulating portion 36B1.

In the example shown in FIG. 12 as well, a distance between wound portion 55A and wound portion 56A is set at pitch P1. In the direction of extension of winding axis O1, a distance L1 between an upper surface 60A1 of wound portion 55A and wound portion 55A is longer than pitch P1.

Distance L1 refers to a length of a shortest portion of the distance between upper surface 60A1 and wound portion 55A in the direction of extension of winding axis O1.

As shown in FIG. 2, aluminum plate 13, capacitor 15, filter 16, rectifier 17 and the like are disposed on the upper surface side of coil module 11A.

When coil module 11 receives electric power, a voltage of several hundreds of kVrms is applied to coil module 11. Therefore, it is necessary to ensure a sufficient insulation distance between coil module 11 and the components including aluminum plate 13, capacitor 15, filter 16, and rectifier 17.

On the other hand, a potential difference between wound portion 55A and wound portion 56A is approximately several hundreds of Vrms. Therefore, it is necessary to ensure an insulation distance between wound portion 55A and wound portion 56A, while the insulation distance between wound portion 55A and wound portion 56A may be shorter than the insulation distance between coil module 11 and aluminum plate 13.

Thus, insulation between coil module 11 and the components such as aluminum plate 13 is ensured by setting distance L1 to be longer than pitch P1.

In the direction of extension of winding axis O1, a distance L2 between wound portion 55A and a lower surface 61A1 is longer than pitch P1. Distance L2 refers to a shortest portion of the distance between lower surface 61A1 and wound portion 55A.

A lower surface of under cover 20 is located on the lower surface side of coil module 11. The lower surface side of under cover 20 is exposed to the outside. Therefore, depending on the external environment of vehicle 2, it is assumed that a metal foreign matter such as an empty can or metal trash is placed on the lower surface side of under cover 20.

A voltage of approximately several kVrms is applied to coil module 11 during power reception. Therefore, an insulation distance between the external metal foreign matter and coil module 11 can be ensured by setting distance L2 to be longer than pitch P1.

Figure 13:
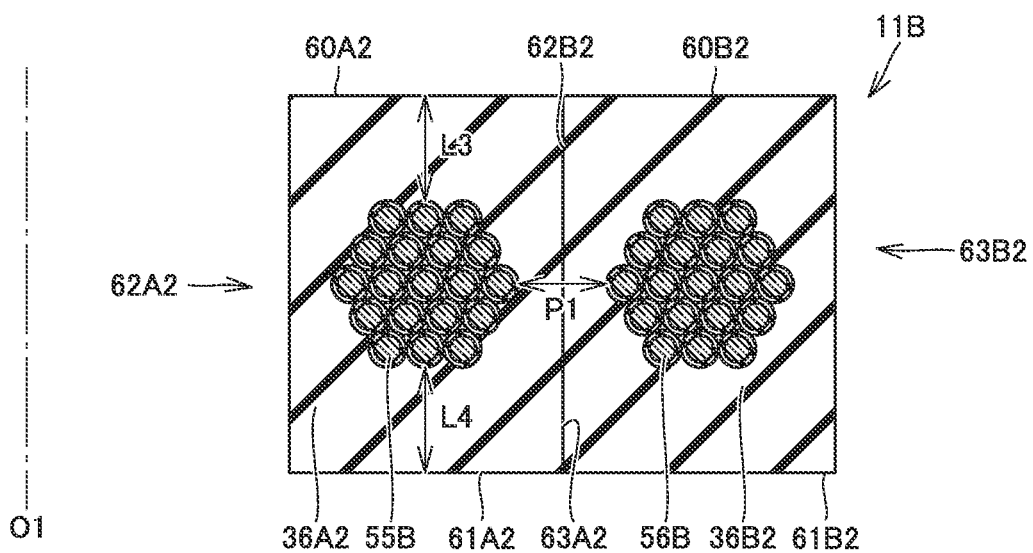
FIG. 13 is a cross-sectional view showing a coil module 11B according to a second modification.

FIG. 13 is a cross-sectional view showing a coil module 11B according to a second modification. Coil module 11B also includes a wound portion 55B, an insulating portion 36A2, a wound portion 56B, and an insulating portion 36B2.

Inner perimeter surfaces 62A2 and 62B2 and outer perimeter surfaces 63A2 and 63B2 of insulating portions 36A2 and 36B2 of coil module 11B are formed to have a flat surface shape.

In coil module 11B, outer perimeter surface 63A2 of insulating portion 36A2 is in contact with inner perimeter surface 62B2 of insulating portion 36B2, thereby setting a pitch between wound portion 55B and wound portion 56B at pitch P1.

That is, in FIG. 10, coil wire module 85 is wound, with coil wire module 85 being under tensile force. As a result, outer perimeter surface 63A2 of insulating portion 36A2 can be reliably brought into close contact with inner perimeter surface 62B2 of insulating portion 36B2, and thus, each coil pitch can be set at pitch P1. As described above, it is not essential that the recessed portions and the protruding portions should be formed on the outer perimeter surface and the inner perimeter surface of insulating member 36.

In coil module 11B as well, a distance L3 between an upper surface 60A2 and wound portion 55B is longer than pitch P1, and a distance L4 between a lower surface 61A2 and wound portion 55B is shorter than pitch P1.

Therefore, insulation between coil module 11B and the aluminum plate as well as insulation between coil module 11B and the metal foreign matter can be ensured.

Figure 14:
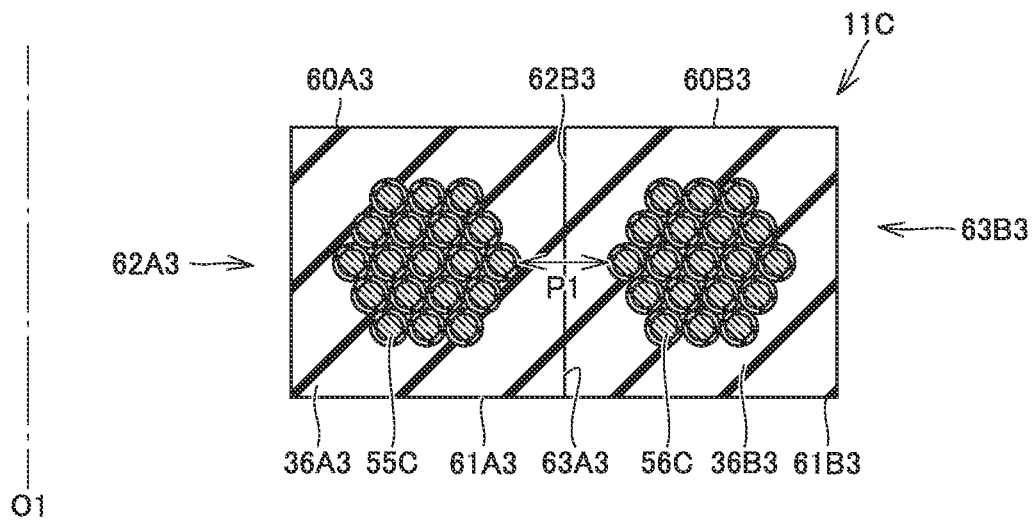
FIG. 14 is a cross-sectional view showing a part of a coil module 11C according to a third modification.

FIG. 14 is a cross-sectional view showing a part of a coil module 11C according to a third modification. Coil module 11C includes a wound portion 55C and an insulating portion 36A3 as well as a wound portion 56C and an insulating portion 36B3.

In coil module 11C as well, an inner perimeter surface 62A3 and an outer perimeter surface 63A3 of insulating portion 36A3 are formed to have a flat surface shape. An inner perimeter surface 62B3 and an outer perimeter surface 63B3 of insulating portion 36B3 are also formed to have a flat surface shape.

In coil module 11C as well, outer perimeter surface 63A3 of insulating portion 36A3 is in contact with inner perimeter surface 62A3 of insulating portion 36B3, thereby setting a pitch between wound portion 55C and wound portion 56C at pitch P1.

In coil module 11C, a distance between an upper surface 60A3 and wound portion 55C as well as a distance between a lower surface 61A3 and wound portion 55C are shorter than pitch P1.

That is, it is not essential that distance L3 should be longer than pitch P1 as shown in FIG. 13.

Figure 15:
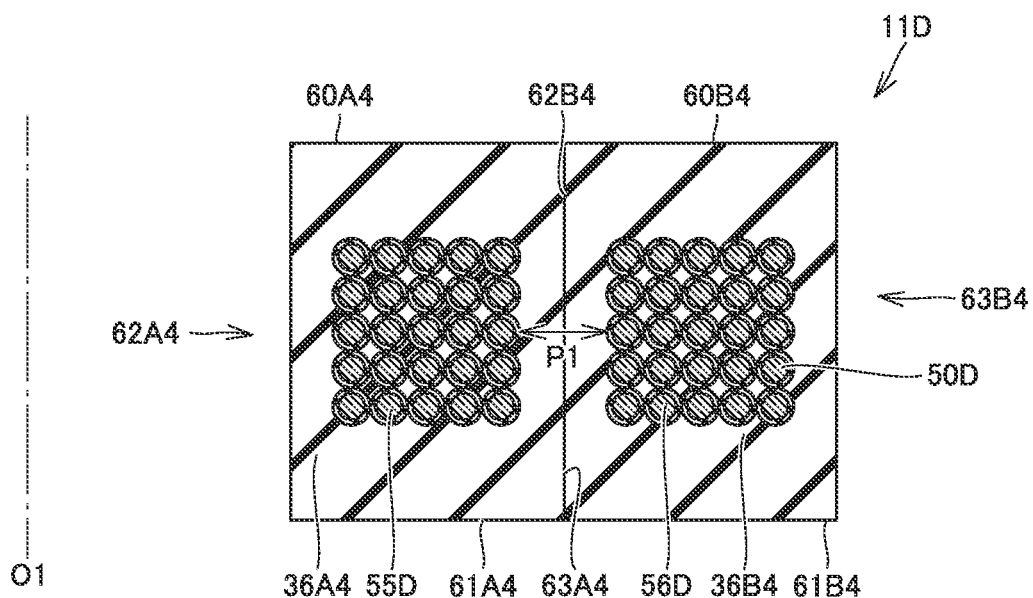
FIG. 15 is a cross-sectional view showing a coil module 11D according to a fourth modification.

FIG. 15 is a cross-sectional view showing a coil module 11D according to a fourth modification. When coil module 11D is cross-sectionally viewed along a cross section perpendicular to a direction of extension of a coil wire 50D, coil wire 50D has a substantially rectangular cross-sectional shape. As described above, coil wire 50D can have various cross-sectional shapes.

Figure 16:
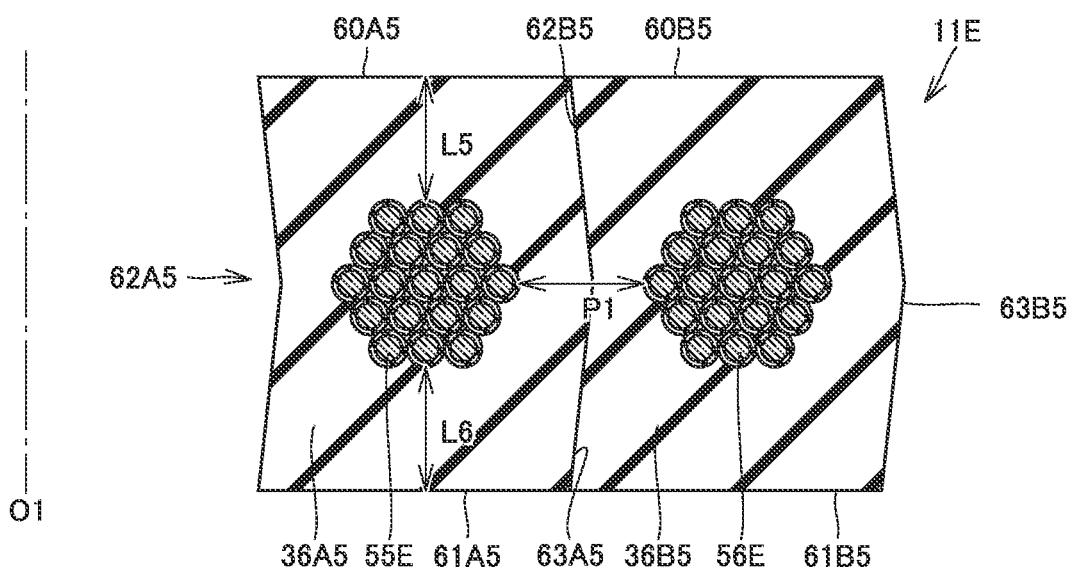
FIG. 16 is a cross-sectional view showing a coil module 11E according to a fifth modification.

FIG. 16 is a cross-sectional view showing a coil module 11E according to a fifth modification. Coil module 11E includes a wound portion 55E and an insulating portion 36A5 as well as a wound portion 56E and an insulating portion 36B5.

An inner perimeter surface 62A5 and an outer perimeter surface 63A5 of insulating portion 36A5 are curved to protrude toward insulating portion 36B5 at the center in the direction of extension of winding axis O1.

An inner perimeter surface 62B5 and an outer perimeter surface 63B5 of insulating portion 36B5 are also curved similarly to inner perimeter surface 62A5 and outer perimeter surface 63A5. Outer perimeter surface 63A5 is in contact with inner perimeter surface 62B5.

In coil module 11E as well, displacement of wound portion 55E and insulating portion 36A5 from wound portion 56E and insulating portion 36B5 in the direction of extension of winding axis O1 can be suppressed.

When insulating portion 36B5 is wound around outer perimeter surface 63A5 of insulating portion 36A5, insulating portion 36B5 is under tensile force, and thus, insulating portion 36B5 comes into close contact with outer perimeter surface 63A5 at the predetermined pressing force. When insulating portion 36B5 comes into close contact with outer perimeter surface 63A5, the tensile force is applied to outer perimeter surface 63B5 in the direction of extension of winding axis O1.

Since outer perimeter surface 63B5 is formed to project in a direction away from winding axis O1 at the center in the direction of extension of winding axis O1, occurrence of a crack and the like in insulating portion 36B5 in outer perimeter surface 63B5 is suppressed. For example, in the case where outer perimeter surface 63B5 is curved to come close to winding axis O1 at the center in the direction of extension of winding axis O1, a crack tends to occur in the curved portion when the tensile force is applied to outer perimeter surface 63B5.

In coil module 11E, outer perimeter surface 63B5 and outer perimeter surface 63A5 are formed to be away from winding axis O1 at the center in the direction of extension of winding axis O1. Therefore, occurrence of the above-described problem can be suppressed.

In coil module 11E as well, a distance L5 between an upper surface 60A5 and wound portion 55E as well as a distance L6 between a lower surface 61A5 and wound portion 55E are longer than pitch P1.

Figure 17:
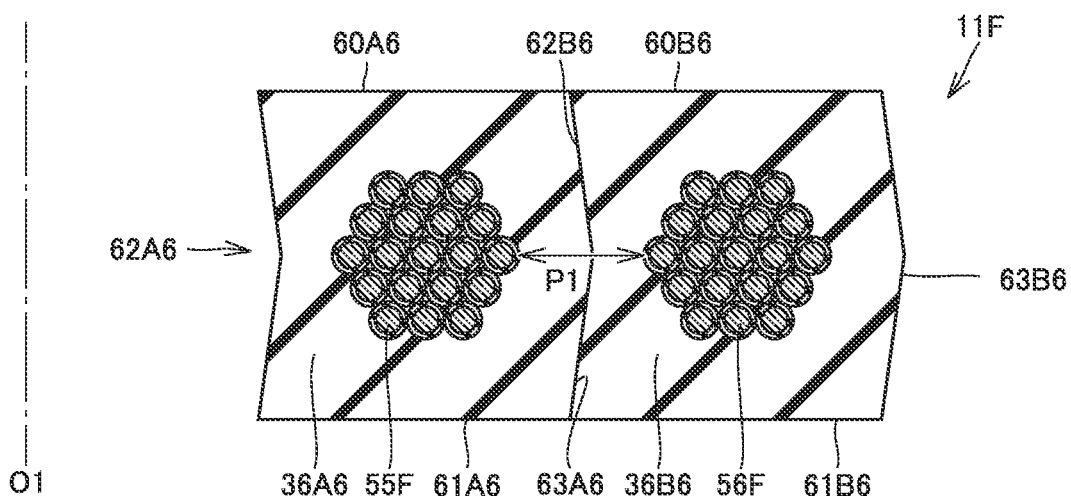
FIG. 17 is a cross-sectional view showing a part of a coil module 11F which is a sixth modification of coil module 11.

FIG. 17 is a cross-sectional view showing a part of a coil module 11F which is a sixth modification of coil module 11. As shown in coil module 11F in FIG. 17, a distance between an upper surface 60A6 and a wound portion 55F as well as a distance between a lower surface 61A6 and wound portion 55F may be shorter than pitch P1.

Although the embodiment and the first to fourth modifications mentioned above have been described in connection with the case in which the coil module according to the present disclosure is applied to coil unit 4 on the power reception side, the coil module according to the present disclosure is of course applicable to coil module 18 provided in coil unit 3 on the power transmission side. Furthermore, the electric power may be transmitted from coil module 11 of coil unit 4 to coil module 18 of coil unit 3.

While the embodiment of the present disclosure has been described above, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A coil module comprising:
a coil formed by winding a coil wire so as to surround a winding axis and get away from the winding axis as the coil wire extends from one end toward the other end; and
an insulating member formed to cover a perimeter surface of the coil wire when the coil wire is cross-sectionally viewed along a cross section perpendicular to a direction of extension of the coil wire, and formed to extend from the one end to the other end of the coil wire,
when the coil is cross-sectionally viewed along the cross section perpendicular to the direction of extension of the coil wire, the coil including a first wound portion and a second wound portion, the first wound portion being formed to surround the winding axis, the second wound portion being formed to surround the winding axis and formed at a position adjacent to the first wound portion on an outer perimeter side of the coil,
the insulating member including a first insulating portion configured to cover a perimeter surface of the first wound portion, and a second insulating portion configured to cover a perimeter surface of the second wound portion,
a portion of a surface of the first insulating portion located on the outer perimeter side of the coil being in contact with a portion of a surface of the second insulating portion located on the winding axis side, thereby spacing the first wound portion and the second wound portion apart from each other by a predetermined distance, wherein
a recess is formed in one of the portion of the surface of the first insulating portion located on the outer perimeter side of the coil and the portion of the surface of the second insulating portion located on the winding axis side, and
a protrusion inserted into the recess is formed on the other of the portion of the surface of the first insulating portion located on the outer perimeter side of the coil and the portion of the surface of the second insulating portion located on the winding axis side.

2. The coil module according to claim 1, further comprising
a mold resin configured to cover the coil and the insulating member.

3. A coil unit capable of at least one of power reception from an external coil unit provided outside and power transmission to the external coil unit,
the coil unit comprising the coil module as recited in claim 1.

4. A coil module comprising:
a coil formed by winding a coil wire so as to surround a winding axis and get away from the winding axis as the coil wire extends from one end toward the other end; and
an insulating member formed to cover a perimeter surface of the coil wire when the coil wire is cross-sectionally viewed along a cross section perpendicular to a direction of extension of the coil wire, and formed to extend from the one end to the other end of the coil wire,
when the coil is cross-sectionally viewed along the cross section perpendicular to the direction of extension of the coil wire, the coil including a first wound portion and a second wound portion, the first wound portion being formed to surround the winding axis, the second wound portion being formed to surround the winding axis and formed at a position adjacent to the first wound portion on an outer perimeter side of the coil,
the insulating member including a first insulating portion configured to cover a perimeter surface of the first wound portion, and a second insulating portion configured to cover a perimeter surface of the second wound portion,
a portion of a surface of the first insulating portion located on the outer perimeter side of the coil being in contact with a portion of a surface of the second insulating portion located on the winding axis side, thereby spacing the first wound portion and the second wound portion apart from each other by a predetermined distance, wherein
in a direction of extension of the winding axis, a distance between an outer surface of the insulating member and the coil is longer than a distance between the first wound portion and the second wound portion.

5. The coil module according to claim 3, further comprising
a mold resin configured to cover the coil and the insulating member.

6. A coil unit capable of at least one of power reception from an external coil unit provided outside and power transmission to the external coil unit,
the coil unit comprising the coil module as recited in claim 4.

* * * * *